UNITED STATES PATENT OFFICE.

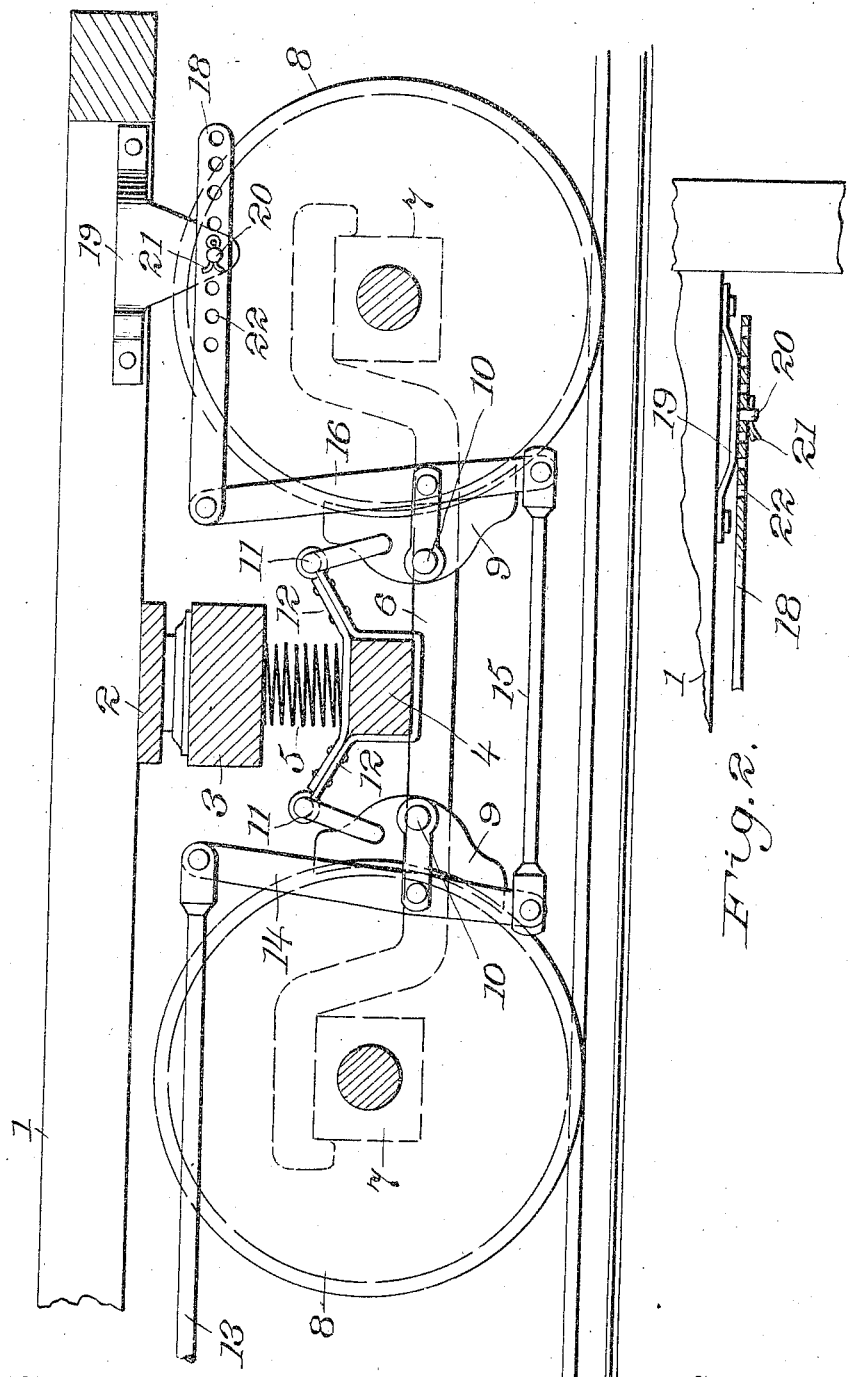

AUGUSTUS PARKER-SMITH, OF NEW YORK, N. Y., ASSIGNOR TO ATLAS SLACK ADJUSTER COMPANY, A CORPORATION OF NEW YORK.

BRAKE-RIGGING.

No. 860,320.      Specification of Letters Patent.      Patented July 16, 1907.

Application filed January 4, 1907. Serial No. 350,839.

*To all whom it may concern:*

Be it known that I, AUGUSTUS PARKER-SMITH, a citizen of the United States of America, and a resident of the borough of Manhattan, city, county, and State of New York, have invented certain new and useful Improvements in Brake-Rigging, of which the following is a specification.

My invention relates to brake rigging for railway cars having swiveling trucks and is designed to relieve said trucks of any twisting or other strains which might otherwise be created when the brakes are applied.

In the present arrangement of brakes on the ordinary railway car having swiveling trucks, the "dead" lever has its fulcrum on the truck. It is evident, therefore, that the pull of the top rod which transmits the force applied to the brakes from the piston or hand brake rigging must be withstood by the king pin or plate on which the truck is swiveled to the car. This top rod pull amounts to 2000 pounds or more on the average freight car. This force tends to pull the truck toward the center of the car and crowds the king bolt against the inner side of its bearing. Owing to the inclined position of the "live" and "dead" levers, this pull is applied not to the center of the truck in line with the king bolt, but at a point about 20 inches to one side of the middle line of the car. This obviously produces a twisting strain on the truck, tending to grind the flanges of the wheels against the rails and to cause the wheels to jump the track. This action is aggravated wherever there are breaks in the continuity of the rails, such as exist at drawbridges, turntables, frogs and switches. If after the hand brakes are set hard with the present rig, thereby twisting the wheel flanges hard up against the rails in one direction, and presenting an unyielding resistance to the truck turning in the opposite direction, the car runs on to a curve, or switch, or cross-over which requires the truck to twist in the said opposite direction, something must give, or the wheels will jump the track. Many brake beams are thus forcibly bent and other parts of brake rigging injured by this action and many derailments are due to it. I have discovered that all these difficulties can be avoided and the trucks left as free to swing when brakes are applied as while they are released, if the "dead" lever be fulcrumed on the car body, instead of on the truck. As the brake beams and levers are usually supported from that portion of the truck below the springs, and the car body moves up and down relatively to them by movement of the springs, it is necessary to make said fulcrum connection to the car body a flexible one.

The best form of apparatus embodying my invention or discovery in which the feature of automatic adjustment is omitted, at present known to me is illustrated in the accompanying sheet of drawings, in which:

Figure 1 is a conventional representation of a railway car truck, shown in vertical section with my invention applied thereto, and Fig. 2 is a detail plan view with parts shown in section.

Throughout the drawings like reference figures indicate like parts. 1 represents a portion of a car body the longitudinal sills of which rest upon the body bolster 2. This is connected to the truck bolster 3 by the usual arrangement of king bolt or plate, and this truck bolster is supported by the springs 5, on the said plank 4, or other rigid portion of the truck frame which as shown is indicated by the side bars 6, extending under the sand plank 4, and resting on the journal boxes 7, 7, which are of course mounted on the journals of the wheels 8, 8.

9, 9, are the usual brake shoes supported on brake beams 10, 10, the brake shoes and beams being supported by the swinging hangers 11, 11, pivoted in the brackets 12, 12, on the sand plank 4.

The braking force is transmitted from the ordinary brake piston or hand brake rigging (not shown) through the top rod 13, to the "live" lever 14, through the bottom rod 15, to the "dead" lever 16. The upper end or fulcrum end of the "dead" lever is pivoted to the swinging or flexible link 18, which is pivoted to the lug 19, carried by one of the longitudinal sills or other convenient portion of the car body. This pivoting, as shown, is done by inserting the pin 20 formed on said lug through one of the holes 22, 22, in the link 18, and retaining the parts in position by the split pin 21, or any other convenient means.

The operation of my invention is as follows: The brakes being adjusted by inserting the pin 20 through that one of the holes 22, 22, which will give the proper amount of travel to the piston of the air brake and the chain of the hand brake, it is evident that all force transmitted through the top rod 13 from the power fulcrum on the car body, will pass through the system of jointed links 14, 15, and 16, where all strains set up are balanced and neutralized one by the other and the resultant strain transmitted to the flexible link 18. This will be withstood by the lug 19 which is fastened to the car body and all strains will be thus absorbed in the rigid frame of the car body. As the "live" lever, the "dead" lever, the bottom lever and the car body practically form a quadrilateral system of jointed links, it is evident that any distortion of said quadrilateral within reasonable limits such as would be produced by any possible swinging of the truck on curves, crossovers, &c., would not meet with any other resistance than the mere friction of the joints between the links. Also, it is evident that the 2000 pound pull of the top rod 13, being withstood by an equivalent 2000 pound pull of the fulcrum link 18, the king bolt or plate by which the truck is pivoted to the car body is left in equilibrium and no strain on the same is created by any brake application no matter how heavy.

The advantages of my invention comprise the freeing of the truck from all twisting strain and the king bolt from all side strains arising from brake applications, as above described, and also the ease of adjustment of the brakes to take up the slack. When the "dead" lever is fulcrumed on the truck, it is necessary for the men to get under the car and over the wheels in order to make this adjustment. The resultant danger of being hurt by the starting up of the train is considerable, and the result is that the brakes are frequently allowed to go without adjustment when they need it badly. With the arrangement herein described, the operator can stand at the end of the car, and reach in to shift the flexible link 18 in or out and thereby adjust the brakes without going under the car at all. The connections of the link 18 to the car body and the "dead" lever being flexible, the variations in their relative positions produced by the compression and expansion of the springs 5 and other movements of the truck, do not interfere with the action of the brake rigging. The brakes being once set, the brake pressure is neither increased nor decreased by any swiveling action of the truck, however sharp the curve may be over which it is running. The present tendency to derailment produced by a heavy application of brakes as the train slows up to take a switch or cross-over, or pass on to a drawbridge, is eliminated, as also the same tendency occurring in the making of a flying switch where the brakeman sets the hand brake as the car approaches the switch or cross-over.

It is evident that various changes could be made in the details of construction illustrated as far as the nature of the flexible connection is concerned, the character of the attachment to the car body, the means for adjusting the position of the "dead" lever, &c., without departing from the principle of my invention.

Having, therefore, described my invention, I claim:—

1. In a system of railway car brakes, the combination of the car body, a wheeled truck swiveled thereto, springs intervening between the body of the truck and the car body, brake shoes supported from that portion of the truck below the springs, a system of brake rigging comprising a "live" lever, a "dead" lever, and a flexible fulcrum connection from the "dead" lever to the car body.

2. In a system of railway car brakes, the combination of the car body, a wheeled truck swiveled thereto, springs intervening between the body of the truck and the car body, brake shoes supported from that portion of the truck below the springs, a system of brake rigging comprising a "live" lever, a "dead" lever, and a flexible fulcrum connection from the "dead" lever to the car body, said connection being adjustable.

3. In a system of railway car brakes, the combination of the car body, a wheeled truck swiveled thereto, springs intervening between the body of the truck and the car body, brake shoes supported from that portion of the truck below the springs, a system of brake rigging comprising a "live" lever, a "dead" lever, and a flexible fulcrum connection from the "dead" lever to the car body, said connection being adjustable, the adjusting means being located near the end of the car body.

4. In a system of railway car brakes, the combination of the car body, a wheel truck swiveled thereto, and a system of brake rigging comprising a "live" lever, a "dead" lever, bottom rod, and an adjustable fulcrum connection from said "dead" lever to the car body, the adjusting means being located near the end of the car body.

5. In a system of railway car brakes, the combination of the car body, a wheel truck swiveled thereto, and a system of brake rigging comprising a "live" lever, a "dead" lever, bottom rod, and an adjustable fulcrum connection from said "dead" lever to the car body, the adjusting means being located near the end of the car body, said adjusting means comprising a pin mounted on the car body and a series of perforations in the fulcrum link adapted to engage said pin.

Signed at New York, N. Y. this 2d day of January, 1907.

A. PARKER-SMITH.

Witnesses:
T. B. FURMAN,
M. G. CRAWFORD.